United States Patent
Sakurai

(10) Patent No.: US 7,179,499 B2
(45) Date of Patent: Feb. 20, 2007

(54) METHOD OF PRODUCING SOY MILK PRODUCTS

(75) Inventor: Seiya Sakurai, Saitama (JP)

(73) Assignee: Kabushiki Kaisha Kyowashokuhin, Saitama (JP)

( * ) Notice: Subject to any disclaimer, the term of this patent is extended or adjusted under 35 U.S.C. 154(b) by 223 days.

(21) Appl. No.: 10/342,318

(22) Filed: Jan. 15, 2003

(65) Prior Publication Data

US 2003/0165609 A1   Sep. 4, 2003

(30) Foreign Application Priority Data

Jan. 15, 2002   (JP) ............................. 2002-006405

(51) Int. Cl.
*A23L 1/20*   (2006.01)
(52) U.S. Cl. ...................... 426/634; 426/656
(58) Field of Classification Search ................ 426/634, 426/656
See application file for complete search history.

(56) References Cited

U.S. PATENT DOCUMENTS 4,813,347 A * 3/1989 Yoshida ....................... 99/483

FOREIGN PATENT DOCUMENTS

| JP | 57-129652 | * | 8/1982 |
| JP | 59-025650 | * | 2/1984 |
| JP | 59-132865 | * | 7/1984 |
| JP | 59-216543 | * | 12/1984 |
| JP | 60-141247 | * | 7/1985 |
| JP | 63-287454 | * | 11/1988 |
| JP | 07-227217 | * | 8/1995 |
| JP | 11-018687 | * | 1/1999 |
| JP | 2000-312561 | * | 11/2000 |

OTHER PUBLICATIONS

Patent Abstracts of Japan; JP 09248129 A; Sep. 22, 1997; Kibun Foods Inc; *Production of Powder Bean Milk*.

* cited by examiner

*Primary Examiner*—Anthony Weier
(74) *Attorney, Agent, or Firm*—Browdy and Neimark, PLLC

(57) ABSTRACT

A method of producing soy milk products which includes the steps of mixing soybean powder having an NSI of less than or equal to 50 with water to obtain a mixture and reducing pH of the mixture to less than or equal to 4. Soy milk products can be produced by this method simply and conveniently.

14 Claims, No Drawings

METHOD OF PRODUCING SOY MILK PRODUCTS

FIELD OF THE INVENTION

The present invention relates to methods of producing soy milk products employing soybean powder, and to soy milk products obtained by these methods.

TECHNICAL BACKGROUND

Conventionally, soy milk is prepared by thoroughly soaking raw soybeans in water, pulverizing the soybeans to prepare a paste, and heating the paste obtained to not less than 100° C. for about 3 to 5 minutes. Recently, a variety of improved producing methods have been developed, along with a variety of soy milk products employing soy milk.

Since soy milk is more than half water, it has a high specific gravity and is problematic in that it requires time and effort to transport. Thus, it is costly to transport soy milk that has been produced in one factory to another factory for the production of a final product; there is a need to reduce this cost. Further, adequate sterilization at high temperature is necessary in the process of producing a final product using soy milk. There is also a need to simplify the equipment and operations required in the sterilization process. There is a further need to improve the quality and tastiness of the final product.

The present inventors conceived that such problems of prior art could be solved by preparing a powder serving as a starting material for soy milk, and then using that powder to produce soy milk products. That is, when a powder serving as a starting material for soy milk is produced in advance, transported to a processing plant, and used to produce a final product, not only can transportation costs be greatly reduced, but the space required by the processing plant can also be greatly diminished.

A number of producing methods have been proposed for powders to be used as starting materials for soy milk. However, when only a powdered starting material for soy milk is employed to produce soy milk products, it is impossible to obtain a quality, tasty product. Further, producing soy milk products still requires a high-temperature sterilization step, precluding the simplification of producing equipment and operations.

For example, Japanese Unexamined Patent Publication (KOKAI) Heisei No. 9-248129 discloses a method of producing powdered soy milk. The method disclosed in this publication is characterized in that the paste is heated at from 45 to 65° C. either instantaneously or for a period not exceeding 20 minutes, the lees are subsequently separated out to obtain soy milk, and the soy milk is spray dried to obtain powder. This method describes that tofu of good elasticity and flavor can be produced. However, soy milk is first prepared and then dried to obtain powder, so this method is not intended to provide a simple method of producing soy milk products. Further, the production of soy milk products requires a high-temperature sterilization step, so a highly tasty soy milk product is not necessarily achieved.

In light of these problems of prior art, the present invention has for its object to provide methods of producing soy milk product that are both simple and inexpensive. A further object of the present invention is to provide methods of producing high-quality and highly tasty soy milk products. A still further object of the present invention is to provide methods of producing soy milk products that do not require the high-temperature sterilization step that is essential in conventional methods.

SUMMARY OF THE INVENTION

The present inventors conducted extensive research to find that in the course of producing soy milk products, the use of soybean powder having a low NSI permits production of superior soy milk products. The present invention was derived on that founding.

That is, the present invention provides a method of producing soy milk products which comprises the steps of mixing soybean powder having an NSI of less than or equal to 50, preferably less than or equal to 40, with water and reducing the pH to less than or equal to 4.

In the method of the present invention, citric acid is desirably added to reduce the pH to less than or equal to 4. In the producing method of the present invention, it is further desirable to employ a soybean powder prepared by heating to from 100 to 115° C. followed by drying. When heating the soybeans, hot air may be employed. Further, the soybeans are desirably heated under pressure.

The present invention also provides soy milk products produced by the above-described method. For example, the above-described method can provide soy milk beverages and soy milk jellies.

BEST MODE OF IMPLEMENTING THE INVENTION

The method of producing soy milk products of the present invention, and soy milk products produced thereby, are described in detail below.

Thus, the method of the present invention is characterized by comprising the step of mixing soybean powder having an NSI of less than or equal to 50 with water to obtain a mixture and reducing pH of the mixture to less than or equal to 4.

Husked soybeans and uncooked soybean powder normally have an NSI of from 80 to 90. One of the characteristics of the present invention is the use, not of commonly employed husked soybeans or uncooked soybean powder, but of a soybean powder that has been processed to have an NSI of less than or equal to 50. The NSI of the soybean powder employed in the method of the present invention is desirably less than or equal to 45, preferably less than or equal to 40.

In the present Specification, the term "NSI" denotes the ratio (%) of water-soluble nitrogen to the total quantity of nitrogen contained in a sample, referred to as the water-soluble nitrogen index. The NSI represents the quantity of nitrogen contained in a water-extracted solution of sample as determined by the Kjeldahl method, expressed as a percentage of the total nitrogen contained in the sample. For the specific procedure, see the method described in Text Example 2, described further below.

In the Kjeldahl method, mercury.mercury (II) oxide.copper sulfate are added to a sample as decomposition agents, heated decomposition is conducted in concentrated sulfuric acid.potassium sulfate or sulfuric acid.fuming sulfuric acid to replace the nitrogen in the sample with ammonium sulfate, a strong alkali is added, steam distillation is conducted, the ammonia that is released is captured by a certain quantity of acid, the excess quantity of acid is reverse titrated to determine the amount of ammonia that has been captured, and the total quantity of nitrogen is calculated from this quantity. For details, see "An Outline of Industrial Analytic Chemistry [I]", (by Wataru FUNASAKA, pub. by Hirokawa Shoten) 7.5.4.

The soybean powder having an NSI of less than or equal to 50 NSI that is employed in the method of the present invention can be obtained, for example, by heating soybeans to 100° C. or above followed by drying. Husked soybeans are desirably employed. Further, the soybeans are desirably partially split, for example.

The heating temperature is desirably from 100 to 120° C., preferably from 100 to 115° C. The means of heating is not specifically limited; heating is desirably conducted by bringing the soybeans into contact with steam.

The period of heating is normally from about 1 to 5 minutes, preferably from 2 to 3.5 minutes.

The heated soybeans can be pulverized and dried to obtain soybean powder.

Pulverization can be conducted using the pulverizers commonly employed to pulverize soybeans. Pulverization is desirably conducted to a degree permitting subsequent complete and efficient drying. The lees are desirably removed either before or after pulverization.

Drying can be conducted by bringing the pulverized soybeans into contact with hot air. The temperature of the hot air is not specifically limited.

The soybean powder thus prepared may be employed as is directly in the soybean product producing process, or employed as needed after having been stored. When stored, the soybean powder is desirably packed in bags or the like to facilitate handling. When this is done, both volume and weight are greatly reduced relative to the transport and storage of soybeans, permitting a substantial reduction in cost.

When producing soy milk products from the soybean powder, the soybean powder is mixed with water and other components. In the course of mixing, the soybean powder may be first dissolved in water and then mixed with the other components, or dissolved in water in which the other components have already been dissolved. The ratio of soybean powder and water in the mixture can be suitably adjusted based on the commercial concept of the desired soybean product. The conventional mixture ratio is from 6 to 12 weight parts of water, preferably from 8 to 10 weight parts of water, and more preferably, about 9 weight parts of water, per weight part of soybean powder.

In the method of the present invention, the pH of the mixture comprising the soybean powder is decreased to 4 or below. The pH of the aqueous solution obtained by dissolving soybean powder in water normally exceeds 4. Thus, in the present invention, a step is conducted of using acid to decrease the pH to 4 or below. The type of acid employed is not specifically limited; examples are citric acid, lactic acid, and acids suited to use in foods. Citric acid is preferred. The pH is desirably adjusted to 3.9 or below.

In the present invention, adjusting the pH to 4 or less prevents activity by bacteria present in the soy milk product, effectively sterilizing the product. Thus, the conventionally required step of large-scale sterilization at high temperature is unnecessary. Since the soybean powder employed in the present invention has already been sterilized at high temperature, there is little chance of bacteria being present in the final product in the first place. However, a short-period of heating may be employed for complete sterilization in the present invention, as well.

In the soy milk products of the present invention, solidified components do not precipitate out, despite a pH of 4 or less. This is because soybean powder having an NSI of less than or equal to 50 is employed as the starting material. For example, when a soy milk product is produced with common soybean powder (with an NSI of 80 or more) obtained by the soaking and pulverization of soybeans, solidified components precipitate out when the pH is adjusted to 4 or less and the value as a commercial product is greatly compromised. Thus, the pH must be maintained in the neutral range, effectively rendering necessary a high-temperature sterilization step at about 120° C.

Since sterilization is simply conducted without the precipitation of solid components by reducing the pH to 4 or less in the method of the present invention, it is possible to inexpensively produce soy milk products while maintaining quality. Further, soy milk products produced by the method of the present invention have been confirmed to have less odor and be tastier than conventional soy milk products. Although not supported by any theory, such good taste is thought to result from the retention of flavorful soybean components due to the unique method of the present invention.

Based on the present invention, various soybean products can be produced. Examples are the soy milk drinks generally enjoyed as soy milk. Soy milk-containing jellies, ice-creams, sherbets, mousses, custard pudding, Bavarian cream, soups, and sauces can also be processed. Application to various other products employing soy milk is also possible.

Various components can be added to soy milk products based on the concept of the soy milk product being produced. For example, fruit juices and flavors such as peach, orange, and grape; sugar; emulsifiers; and pectins and other thickening polysaccharides can be suitably added as needed.

The characteristics of the present invention are specifically described below through examples, comparative examples, and test examples. The materials, quantities employed, ratios, processing contents, processing procedures, and the like indicated in the examples below can be suitable modified without departing from the scope or spirit of the present invention. Accordingly, the scope of the present invention is not to be interpreted as being specifically limited to what is indicated below.

EXAMPLE 1

Production of the Soy Milk of the Present Invention

A 150 g quantity of soybeans was blown for 2 hours with 60° hot air and then husked. The husked soybeans were exposed to steam at from 100 to 120° C. for 3 min and pulverized. The lees were removed and the product was dried to prepare 100 g of soybean powder.

A 900 g quantity of water was added to the 100 g of soybean powder obtained, the components were stirred at 95° C., and the mixture was filtered with a 50-mesh cloth to obtain a soybean powder aqueous solution.

The various components listed below, including the soybean powder aqueous solution obtained, were admixed to obtain a highly uniform mixture. The pH was 4.4 following mixing. Citric acid was added to the mixture to adjust the pH to 4.0. Subsequently, sterilization was conducted at 92° C. for from 1 to 3 seconds and the mixture was packed into containers at 87° C., yielding a soy milk.

TABLE 1

| Component | Weight (g) |
| --- | --- |
| Litchi ½ juice | 80 |
| Granulated sugar | 30 |
| Pectin (AYD-31 manufactured by Snow Brand Milk Products, Co., Ltd.) | 2 |
| Water | 90 |
| Soybean powder aqueous solution | 200 |

EXAMPLE 2

Production of the Soy Milk of the Present Invention

Another soy milk was produced with the soybean powder aqueous solution produced in Example 1.

Specifically, a pectin solution was added to the soybean aqueous solution at a temperature not exceeding 50° C. The fruit juice, acid, flavor, and other components were admixed to obtain a mixture. The pH was 3.98 and the Brix 16.31. Subsequently, sterilization and packing into containers were conducted in the same manner as in Example 1 to obtain a soybean.

TABLE 2

| Component | Weight (g) |
| --- | --- |
| Soybean powder aqueous solution | 711 |
| Granulated sugar | 162 |
| Peach juice (fivefold concentration) | 27 |
| Citric acid | 5.4 |
| Pectin (AYD-31 manufactured by Snow Brand Milk Products, Co., Ltd.) | 5.4 |
| Emulsifier | 1.35 |
| Milk flavor | 0.68 |
| Peach flavor | 1.35 |
| Water | Remainder |
| Total | 1,400 |

The soybean powder solid component was 2.91 percent.

EXAMPLE 3

Production of the Soy Milk of the Present Invention

Yet another soy milk was produced with the soybean powder aqueous solution produced in Example 1.

Specifically, a pectin solution was added to the soybean aqueous solution at a temperature not exceeding 50° C. The fruit juice, acid, flavor, and other components were admixed to obtain a mixture. The pH was 4 and the Brix 13.19. Subsequently, sterilization and packing into containers were conducted in the same manner as in Example 1 to obtain a soybean.

TABLE 3

| Component | Weight (g) |
| --- | --- |
| Soybean powder aqueous solution | 500 |
| Granulated sugar | 100 |
| Peach juice (fivefold concentration) | 20 |
| Citric acid | 3 |
| Pectin (AYD-31 manufactured by Snow Brand Milk Products, Co., Ltd.) | 3 |
| Milk flavor | 0.5 |
| Peach flavor | 1 |
| Water | Remainder |
| Total | 1,000 |

The soybean powder solid component was 2.56 percent.

COMPARATIVE EXAMPLES 1 to 3

Production of a Soy Milk by the Conventional Method

For comparison, a soy milk was prepared by the conventional method.

Instead of the soybean powder aqueous solution employed in Example 1 to 3, a soybean powder was employed that was obtained by drying 150 g of soybeans for 2 hours in 60° C. hot air, husking the soybeans, soaking the husked soybeans in water, and pulverizing the soybeans. With the exception that this soybean powder was employed, the same methods were employed as in above-described Examples 1 to 3 to obtain soybean corresponding to Examples 1 to 3 as Comparative Examples 1 to 3.

TEST EXAMPLE 1

Organoleptic Testing

Organoleptic testing of the soy milk produced in Examples 1 to 3 and Comparative Examples 1 to 3 was conducted by a five-member panel.

As a result, the five-member panel evaluated the soy milk produced in Examples 1 to 3 as being tastier, having less odor, and being more delectable than the soy milk produced in Comparative Examples 1 to 3.

TEST EXAMPLE 2

NSI Measurement

About 5 g of sample were weighed out into the glass tube employed in a centrifugal separator and 50 mL of 20° C. water were added. The sample was stirred with a glass rod to prevent solidification, a rubber stopper was inserted, and the glass tube was secured in a vibrator and shaken for 60 min at a total amplitude of about 60 mm with 150 passages back and forth per minute. The tube was then removed, placed on a centrifugal separator, and centrifugally separated for 10 min at 2,000 rpm. The tube was then removed and the supernatant was recovered. A 50 mL quantity of water was then added to the remaining contents of the tube, and in the same manner as above, the mixture was vibrated for 60 min and centrifugally separated for 10 min, after which the supernatant was recovered. This operation was repeated four times and the supernatants (extracted solutions) were collected, the equipment was washed with a small quantity of water, and the wash liquid was recovered and combined with the supernatants. A suitable quantity of water was added and the mixture was filtered, yielding a filtrate.

The filtrate obtained was charged to a Kjeldahl flask and decomposed, distilled, and titrated according to the Kjeldahl method. A product to which the sample had not been added was also decomposed, distilled, and titrated according to the Kjeldahl method. A 0.1 mol/L sodium hydroxide aqueous solution was employed in titration.

The water-soluble nitrogen content (Ns) of the sample was obtained from the following equation, letting (B) denote the titre of sodium hydroxide in the sample, (A) the titre of the sodium hydroxide aqueous solution in the blank test, (F) the sodium hydroxide aqueous solution factor, and (C) the amount of sample collected.

$$Ns=(A-B)\times 0.0014\times F\times 25/C\times 100$$

The total quantity of nitrogen (N) of the sample was also determined in the same manner and the NSI was calculated according to the following equation:

$$NSI=Ns/N\times 100$$

The results of NSI determination of husked soybeans, the soybean powders employed in the above-described examples, and the soybeans powders employed in the above-described comparative examples are given in the table below. The protein ratio is also given.

TABLE 4

|  | NSI | Protein (weight percentage) |
| --- | --- | --- |
| Husked soybeans | 82.71 | 35.00 |
| Soybean powder of comparative examples | 89.93 | 34.60 |
| Soybean powder of examples (present invention) | 38.60 | 36.83 |

The above results indicate that processing soybeans by the method of the examples yielded soybean powder with an NSI of less than 50.

The method of the present invention is simple and provides inexpensive soy milk products. The method of the present invention can provides high-quality, tasty soy milk products without the high-temperature sterilization step that is conventionally required. Accordingly, the present invention can be widely employed as a method of producing various soy milk products.

What is claimed is:

1. A method of producing soy milk products which comprises
   heating soy bean at from 100 to 115° C.,
   pulverizing and drying the heated soy bean to obtain soybean powder having an NSI of less than or equal to 50,
   mixing the soy bean powder with water to obtain a mixture, and
   reducing pH of the mixture to less than or equal to 4.

2. A method of producing soy milk products according to claim 1, wherein said soybean powder has an NSI of less than or equal to 45.

3. A method of producing soy milk products according to claim 1, wherein said soybean powder has an NSI of less than or equal to 40.

4. The method of claim 1 wherein citric acid is added to reduce the pH to less than or equal to 4.

5. The method of claim 1 wherein lactic acid is added to reduce the pH to less than or equal to 4.

6. The method of claim 1 wherein said heating of soybeans is conducted for from 1 to 5 minutes.

7. The method of claim 1 wherein said heating of soybeans is conducted from 2 to 3.5 minutes.

8. The method of claim 1 wherein said heating of soybeans is conducted with steam.

9. The method of claim 1 wherein said heating of soybeans is conducted under pressure.

10. The method of claim 1 wherein said drying of soybeans is conducted by the blowing of dry air.

11. The method of claim 1 wherein following the mixing of soybean powder and water, filtering is conducted and the liquid obtained is reduced to a pH of less than or equal to 4.

12. The method of claim 1 wherein from 6 to 12 weight parts of water are admixed per weight part of soybean powder.

13. The method of claim 1 wherein from 8 to 10 weight parts of water are admixed per weight part of soybean powder.

14. The method of claim 1 wherein about 9 weight parts of water are added per weight part of soybean powder.

* * * * *